Sept. 11, 1928.  E. WILDHABER ET AL  1,683,938
DIFFERENTIAL MECHANISM
Filed April 9, 1925    2 Sheets-Sheet 1
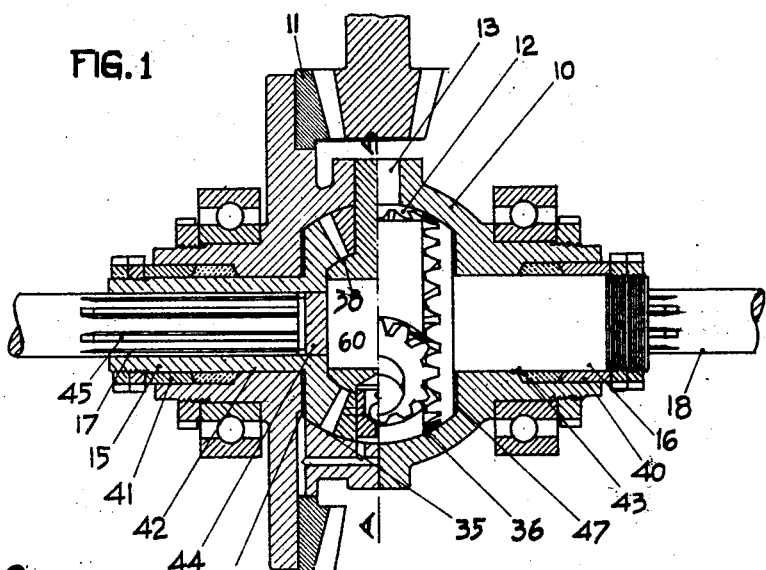
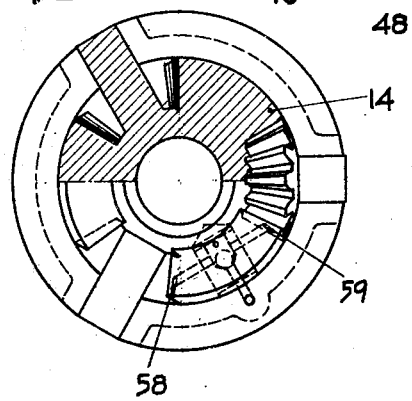
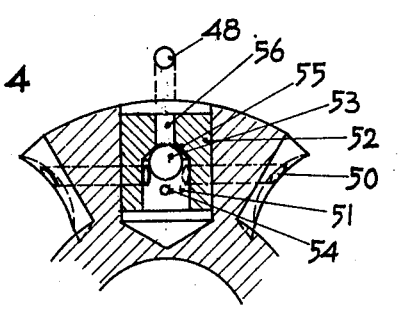
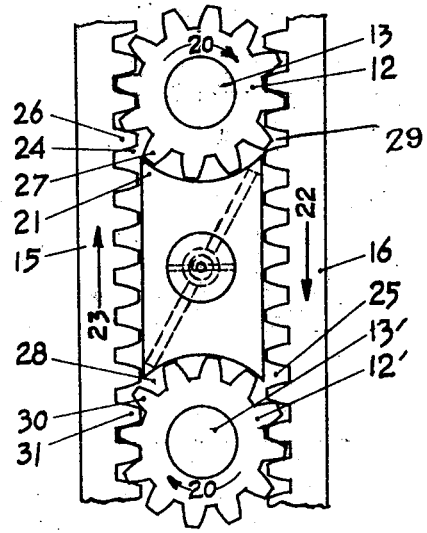
INVENTOR.
Ernest Wildhaber
Joseph Gstyr Sept. 11, 1928.
E. WILDHABER ET AL
1,683,938
DIFFERENTIAL MECHANISM
Filed April 9, 1925
2 Sheets-Sheet 2
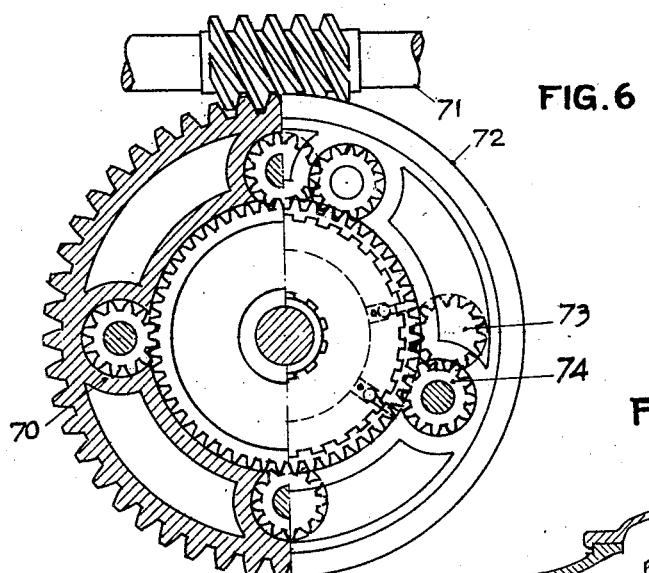
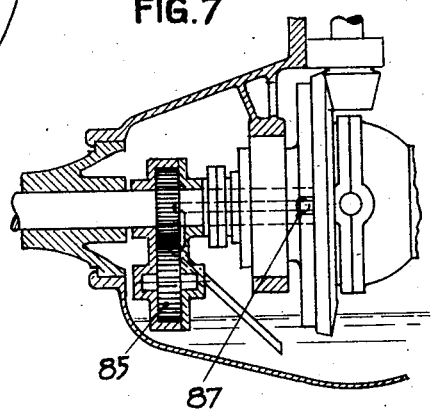
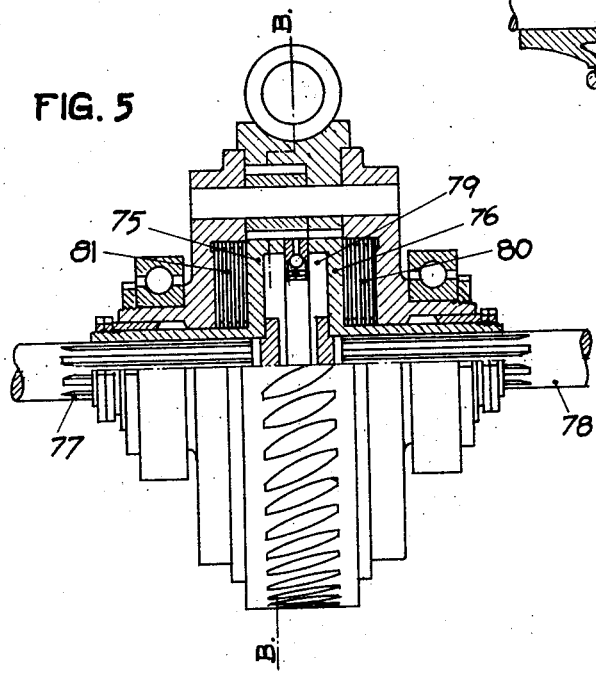
INVENTOR.
Ernest Wildhaber
Joseph Gstyr Patented Sept. 11, 1928.

1,683,938

UNITED STATES PATENT OFFICE.

ERNEST WILDHABER AND JOSEPH GSTYR, OF ROCHESTER, NEW YORK.

DIFFERENTIAL MECHANISM.

Application filed April 9, 1925. Serial No 21,809.

Our invention relates to differential mechanisms for self propelled vehicles, and particularly to such differential mechanisms, as at present are used in rear axle drives of automobiles, trucks and tractors.

A differential mechanism, as well known, serves the purpose to apply independent motion to the driven wheels of a car, so that the two rear wheels are enabled to rotate at different speeds, when the car turns.

The said independent motion, however, is in certain cases a serious drawback and danger. It namely has as a consequence that both driven wheels must grip the ground, to apply power to the wheels. If one of the wheels loses its grip, it will turn around faster, while the other wheel stands still, and the car gets out of control. Such conditions are particularly frequent and dangerous on frozen roads, and on muddy ground.

One purpose of our invention is to provide a safety differential mechanism, that shall wholly fulfill the requirements of such mechanism without having the above said defect.

A further object is to provide a differential mechanism, that shall brake relative motion of the driven members at a rate increasing with increasing relative motion, so that the differential mechanism transmits independent motion to the wheels of a car, when said car turns, but tends to lock the differential, as soon as a wheel starts to spin.

Other objects are to brake relative motion between the driven members by hydraulic means, and by hydraulically operated means.

A further aim is to provide a differential mechanism, having gears acting as oil pumps, to create increasing oil pressure at increasing relative motion between the driven members.

Our invention may be applied to every type of differential gear. Embodiments are shown in the accompanying drawings, in which:

Fig. 1 is an axial section through a differential casing, showing the contents partly in section, partly in elevation.

Fig. 2 is an interior view of a differential casing, with some of the contents removed, and partly a section along lines A—A of Fig. 1.

Fig. 3 is a development of the outside peripheries of gears, illustrating the pumping action of the gears in the differential casing.

Fig. 4 is an enlarged view of a valve, such as might be used in our differential mechanism.

Fig. 5 is an axial section through a differential casing, with the contents partly in section, partly in elevation, and illustrates a modified embodiment of our invention.

Fig. 6 is a section taken along lines B—B of Fig. 5.

Fig. 7 is a schematic view of a further embodiment.

Referring to Fig. 1 and Fig. 2, motion is applied to an oil tight casing 10 in any suitable way, such as by a gear 11. In casing 10 planetary pinions 12 are rotatable on journals 13 of a spider 14, which is rigidly secured to casing 10. Pinions 12 cooperate with sun gears 15, 16, which constitute the driven members and are secured to shafts 17, 18, which turn the wheels of a car.

Ordinarily, pinions 12 will transmit equal motion to the two gears 15, 16, and not turn on their journals 13. The differential mechanism then turns around as a solid unit. When a wheel starts to spin, the two gears 15, 16 move relatively to each other, and the planetary pinions 12 turn on their journals.

According to our invention such relative motion between the driven members 15 and 16 is braked at an increasing rate at increasing relative speed, so that the differential mechanism approaches being locked at increasing relative speed.

To this end, casing 10 is filled with fluid, such as oil or grease, and the circulation of such fluid is prevented or hampered by suitable means.

The action of a fluid will be explained with reference to Fig. 3. Let it be assumed that the pinions 12, 12′ turn on their centers 13, 13′ in the direction of arrows 20, and that gears 15, 16 correspondingly move in the directions 22, 23 respectively.

The fluid, which completely fills casing 10, is then squeezed out of the tooth spaces 24, 25 by teeth 26, 27 entering these spaces. A close fitting projection 21, secured to or part of casing 10, prevents circulation of the fluid, so that pressure is created at 24 and 25. In the tooth spaces 28, 29 the leaving teeth 30, 31 cause a suction. Pressure and suction come into existence through the presence of projection 21, and would not occur, if free circulation could take place.

Pressure and suction oppose the motions of the gears, and hence tend to lock the differential, that is they tend to reduce and to prevent relative motion of the driven members.

In other words, the gears of the differential mechanism act like gear pumps, and squeeze the fluid from the pressure sides 24, 25 to the suction sides 28, 29 through such fine openings as always exist between a turning and a stationary body. It is obvious that considerable pressure is thus created, and that relative motion between the gears 15, 16 is very considerably opposed, especially when a fluid of large viscosity is used in the differential casing.

If so desired, a small safety valve may be provided, to prevent the pressure from increasing over a given point.

Casing 10 (Fig. 1) is preferably formed spherical at 35, 36, where the teeth of the gears and pinions contact with it. Moreover the inner or smaller end of the teeth bears against a convex spherical surface 38, which may be made part of spider 14, and which serves to make the mechanism internally as tight as possible. The power required for squeezing the fluid from the pressure sides to the suction sides increases with increasing internal tightness, and so does the locking effect.

It is noted that exactly the same amount of fluid is pressed out of the teeth, on the pressure side, as the teeth of the suction side are capable of absorbing. The hydraulic mechanism is therefore self contained, and there is little or no tendency to press the fluid out of casing 10 itself.

Nevertheless stuffing boxes 40, 41 are preferably provided, to prevent the fluid from flowing out of casing 10 through the bearings 42, 43. These places are the only places to be kept tight, while (occasionally) relative motion occurs. All other parts to be kept tight are relatively stationary.

Casing 10 is made of two parts, which are tightly bolted together. Gears 15, 16 contain tightly fitted covers 44, which prevent the fluid from flowing through the splines 45.

The safety against leakage may be further increased, by connecting the spaces 46, 47 through channels 48 with suction sides of the differential gear. Inasmuch as the location of the pressure and suction sides changes with the direction of rotation of pinions 12, a suitable valve should be used in the channels 48, to prevent connection with the pressure side.

A valve as might be used is illustrated in Fig. 4. Two diagonally opposite sides 28, 29 (Fig. 3 and Fig. 4), which are simultaneously either suction sides, or pressure sides, are connected by a bore 50 which leads to a valve 51. Valve 51 consists of an inserted body 52 and of a ball 53, which is prevented from dropping out by a pin 54.

When the sides 28, 29 are under pressure, ball 53 is pressed to its seat 55, and the connection with hole 56 and channels 48 is disrupted.

When the sides 28, 29 are under suction, ball 53 will drop from its seat 55, and connection is established.

Preferably the spaces 46, 47 are also connected with sides 58, 59 of opposite character as compared with sides 28, 29, and which are under suction when sides 28, 29 are under pressure. There is then always connection with a suction side, so that the spaces 46, 47 never are under any appreciable pressure.

If so desired, similar connections may be provided to draw in fluid, particularly oil, from outside of casing 10, whenever the pinions 12 turn on their journals.

In addition to the described hydraulic braking or locking effect of the differential mechanism, there is a further factor which considerably helps in braking relative velocity at substantial speed differences of the driven members.

The pressure created between the gears 15, 16 namely tends to thrust these gears apart, so that they are pressed against casing 10, thereby exerting considerable friction, tending to move the gears and the casing as a rigid unit. The friction is increased, when gears 15, 16 bear against a spherical surface 35, 36 of casing 10, which surface acts like a conical clutch. Moreover, if so desired, a valve may be so arranged that the central chamber 60 is always under full pressure.

Owing to the hydraulic action and the viscosity of the fluid, pressure will be created at an increasing rate at increasing relative speed of the driven members (15 and 16), that is at increasing speed of rotation of pinions 12, on journals 13.

When a wheel loses its grip on the ground, slips and starts to rotate rapidly, slowing down the other wheel, fast relative motion occurs, and the differential mechanism immediately tends to be locked.

When however the car turns, full differential action takes place, because the slow relative motion of the driven members does not involve any material locking effect. Sharp corners, namely, are always taken slowly, and large turns, even if taken at high speed, will effect only slow relative motion in the differential mechanism.

In a known type of differential mechanism friction between gear teeth is artificially created. Such friction, however, is largest when the driven members are relatively at rest. The larger the relative speed, the more the frictional torque decreases. Moreover the friction depends to a great extent on the tooth load of the gears, which is small in the critical moments, when a wheel slips.

For these reasons such known mechanism fails to be locked, when need occurs, and tends to be locked, when the car turns and the differential mechanism should operate freely.

Fig. 5 and Fig. 6 illustrate our invention as applied to a spur gear differential. In this embodiment also the gears of the differential act as gear pumps, when the wheels of the car rotate at different speeds. Increasing pressure is thus created at increasing differences of speed. 70 denotes the differential casing, to which power is applied in any suitable way, such as by a worm-wheel drive. 71, 72; 73, 74 are pairs of planetary pinions. Numerals 75, 76 denote the driven gears, which are secured to shafts 77, 78 respectively.

In this embodiment of our invention, the created pressure is utilized in a separate device for braking relative motion. The pressure tends to separate the gears 75, 76, and to move them axially, especially if the space 79 between said gears is kept under full pressure. The gears 75, 76 and casing 70 are connected by means of disk clutches 80, 81, which tend to lock the differential, when the gears 75, 76 are thrust apart.

Fig. 7 illustrates a modified embodiment of our invention in a diagrammatic way. A gear pump 85, operated by the rotation of the casing 10, or by one of the driven shafts, pumps oil from the bottom of the rear axle housing and keeps the differential casing 10 continuously under pressure. A valve 86 is preferably provided, to close the connection 87 during the moments, when the inside pressure exceeds the pressure of pump 85. Such conditions may occur when relative motion takes place between the two driven members.

Pump 85 keeps the differential casing always filled up with oil, in a positive way.

If so desired, a pump of the reciprocating type or of a still other type may be provided in place of gear pump 85.

Inasmuch as details of pumps, valves and clutches are sufficiently known, further explanation is not deemed necessary.

It is understood that such changes and modifications may be made in our invention, as fall within the scope of the appended claims.

We claim as our invention:

1. A differential mechanism for self driven vehicles, comprising a driving member and two coaxial driven members, means to transmit motion from the driving member to said driven members, said means comprising planetary gears disposed to turn on their axes in exact proportion to the relative turning motion between said two driven members, means to effect fluid pressure through the mesh of said gears, and additional means operated by said fluid pressure to brake said relative motion.

2. A differential mechanism for self driven vehicles, comprising a rotary casing receiving power from the motor, two coaxial driven members, two sun gears secured to said driven members, planetary pinions in said casing, said planetary pinions meshing with said sun gears, sun gears and planetary pinions being so disposed that the motion of one sun gear positively affects the motion of the other, means for creating fluid pressure through displacement of fluid during relative motion between said driven members, and additional means operated by said fluid pressure, for braking said relative motion.

3. A differential mechanism for self driven vehicles, comprising a rotary casing receiving power from the motor, two coaxial driven members, two sun gears secured to said driven members, planetary pinions in said casing, said planetary pinions meshing with said sun gears, the sun gears and planetary pinions being so disposed that the motion of one sun gear positively affects the motion of the other, means for maintaining fluid pressure, additional parts suited to engage in sliding contact during relative motion between said two driven members, and means for effecting friction between said parts with said fluid pressure.

4. A differential mechanism for self driven vehicles, comprising in combination, a rotary casing receiving power from the motor, two coaxal driven members, two sun gears secured to said driven members, planetary pinions in said casing, said planetary pinions meshing with said sun gears, sun gears and planetary pinions being so disposed that the motion of one sun gear positively affects the motion of the other, means for creating fluid pressure through relative motion between said driven members, and a multiple disk brake operated by said fluid pressure, for braking said relative motion.

In testimony whereof, we hereto affix our signatures.

ERNEST WILDHABER.
JOSEPH GSTYR.